United States Patent [19]

Ikeda

[11] Patent Number: 4,954,944
[45] Date of Patent: Sep. 4, 1990

[54] CACHE COTROL CIRCUIT IN CACHE MEMORY UNIT WITH UNIT FOR ENABLING TO REDUCE A READ ACCESS TIME FOR CACHE MEMORY

[75] Inventor: Sadanobu Ikeda, Tokyo, Japan

[73] Assignee: NEC Corporation, Tokyo, Japan

[21] Appl. No.: 184,912

[22] Filed: Apr. 22, 1988

[30] Foreign Application Priority Data

Apr. 23, 1987 [JP] Japan .................................. 62-98564

[51] Int. Cl.$^5$ .................................................. G06F 13/00
[52] U.S. Cl. .................................. 364/200; 364/900; 364/964.2; 364/243.4; 364/243.41
[58] Field of Search ... 364/200 MS File, 900 MS File

[56] References Cited

U.S. PATENT DOCUMENTS

| | | | |
|---|---|---|---|
| 4,197,580 | 4/1980 | Chang et al. | 364/200 |
| 4,398,243 | 8/1983 | Holberger et al. | 364/200 |
| 4,453,230 | 6/1984 | Mizoguchi et al. | 364/900 |
| 4,622,631 | 11/1986 | Frank et al. | 364/200 |
| 4,646,233 | 2/1987 | Weatherford et al. | 364/200 |

*Primary Examiner*—Gareth D. Shaw
*Assistant Examiner*—Gopal C. Ray
*Attorney, Agent, or Firm*—Foley & Lardner, Schwartz, Jeffery, Schwaab, Mack, Blumenthal & Evans

[57] ABSTRACT

A cache control circuit in a cache memory unit having a cache memory in cooperation with an address conversion unit for converting a logical address into a physical address, a main memory, and a central processing unit. The central processing unit issues a control signal comprising a write/read request together with a logical address. The address conversion unit converts the logical address into the physical address which is applied to the cache memory unit. When the address conversion unit does not have a physical address corresponding to the logical address, the address conversion unit delivers a mismatch signal to the central processing unit and the cache control circuit to inform them of invalidation of the issued read/write request. The cache memory unit decides whether or not the physical address received is valid in the cache memory unit and produces a hit signal when it is valid. When the control signal has a read request as the read/write request, the cache control circuit produces a read access signal for carrying out the read operation prior to decision of the hit signal and the mismatch signal. Accordingly, the read access time to the cache memory is reduced. When the control signal has a write request as the read/write request, the cache control circuit produces a write access signal for writing data from the central processing unit into the cache memory after the decision of the hit signal and the non-mismatch signal is performed.

5 Claims, 4 Drawing Sheets

CACHE COTROL CIRCUIT IN CACHE MEMORY UNIT WITH UNIT FOR ENABLING TO REDUCE A READ ACCESS TIME FOR CACHE MEMORY

BACKGROUND OF THE INVENTION

1. Field of the Invention

The present invention relates to a cache memory circuit for use between a main memory and a request source such as a central processing unit and in particular, to a cache control circuit in such a cache memory circuit.

2. Description of the Prior Art

A cache memory circuit is used between a main memory and a central processing unit in a high speed information processing system and holds temporarily those portions of the contents of the main memory which are currently used by the central processing unit. The cache memory is a small and high speed buffer memory and therefore, an access time for the cache memory is quite less than that for the main memory. Therefore, the central processing unit spends a reduced waiting time for data such as instructions and operands to be fetched and/or stored.

On the other hand, the formation processing system uses the logical or virtual addressing method. In the case, the central processing unit issues a logical address together with a read/write request. Accordingly, the cache memory circuit is associated with an address conversion circuit for converting the logical address into a physical or real address on the main memory The logical address issued from the central processing unit comprises a first logical address portion such as a logical page address and a second logical address portion such as a logical line address. The first address portion is converted into a first physical address portion by the address conversion circuit, and the converted first physical address portion is supplied to the cache memory circuit. The second logical address portion is directly applied to the cache memory circuit as a second physical address portion without address conversion. When receiving the first and the second physical address portions, the cache memory circuit starts to write/read operation for a cache memory or a data memory under control of a cache control circuit in the cache memory circuit after deciding whether or not data are held in the cache memory which are corresponding to the physical address comprising a pair of the first physical address portion and the second physical address portion as received.

When the address conversion circuit cannot convert the first logical address portion because of absence of the first physical address portion corresponding to the first logical address portion, the address conversion circuit produces a mismatch signal. The mismatch signal is delivered to the central processing unit and the cache memory circuit. Then, the central processing unit decides the present write/read request invalid while the cache memory circuit is prevented by the mismatch signal from starting the write/read operation for the cache memory.

In a case where the address conversion circuit is not desired to be formed together with the cache memory circuit in a chip of an integrated circuit because of an increased cost of the integrated circuit chip, the address conversion circuit is provided as an integrated circuit chip separated from a chip having the cache memory circuit. In use of the address conversion circuit of the separate type which will be referred to as the address conversion unit, it takes a comparatively long time to issue the mismatch signal from the address conversion unit and also to decide the mismatch signal at the cache control circuit. As a result, an unignorable waiting time is spent until the cache memory unit starts the read/write operation after reception of the control signal from the central processing unit. This does not mean that the high speed performance of the central processing unit is fully utilized.

SUMMARY OF THE INVENTION

It is an object of the present invention to provide a cache control circuit in a cache memory unit for use together with a separated address conversion unit in an information processing system comprising a main memory and a central processing unit as a request source wherein a read access time for the cache memory can be reduced so that the high speed performance of the central processing unit is insured.

A cache control circuit in the cache memory unit, to which the present invention is applicable, is for use in cooperation with a main memory, a request source, and an address conversion unit. The request source delivers a control signal comprising a read/write request together with a logical address comprising a first logical address portion and a second logical address portion. The address conversion unit converts the first logical address portion into a first physical address portion corresponding to the first logical address portion to produce a converted address signal at an output terminal when the address conversion unit has the first physical address portion corresponding to the first logical address portion. The address conversion unit produces a mismatch signal when the address conversion unit has no first physical address portion corresponding to the first logical address portion, and the mismatch signal is delivered to the cache control circuit and the request source at a predetermined time duration after reception of the control signal. The request source decides the read/write request invalid upon reception of the mismatch signal. The second logical address portion is directly applied to the cache memory unit as a second physical address portion without conversion. The cache memory unit comprises data memory unit for temporarily holding data in contents in the main memory which are currently used by the request source, control memory means for holding pairs of address tags and data memory addresses of the data held in the data memory unit, the control memory means responsive to the second physical address portion producing one pair of the pairs of the address tags and the data memory addresses which is corresponding to the second physical address portion as a read address tag and a read data memory address, and comparing unit coupled with the output terminal of the address conversion unit for comparing the read address tag and the converted output signal at the output terminal to deliver a hit signal to the cache control when conformity is detected between the read address tag and the converted output signal. The cache control circuit receives the control signal, and the cache control circuit produces a read access signal for carrying out a read operation for the data memory unit with use of the read data memory address when the read/write request of the control signal is a read request. The cache control circuit of the present invention comprises decoding unit responsive to the control signal for decoding the control signal to extract the read request to produce a read request signal, the decoding unit producing a start signal upon reception of the control signal, timing generator unit responsive to the start signal for sequentially generating timing signals at predetermined intervals, and unit for producing the read access signal to the data memory unit upon reception of both of the read request signal and a first one of the timing signals which is initially produced from the timing generator unit, whereby the read operation for the data memory means starts in no relation with the hit signal and the mismatch signal.

The cache control circuit may further comprise hit signal deciding unit responsive to a second one of the timing signals which is later than the first one by a predetermined time interval for deciding whether or not the hit signal is delivered from the comparing unit, the hit signal deciding means delivering a ready signal to the request source when the hit signal is present, the request source entering a waiting condition in absence of the ready signal.

In an aspect where the cache memory unit further comprises means responsive to a main memory read request signal from the cache control circuit for accessing the main memory for reading, as a read block of data, data from an address in the main memory determined from the first and second physical address portions, the cache control circuit further comprises means for generating the main memory read request signal when the hit signal is decided absent in response to the second timing signal.

In another aspect, the cache memory control circuit further comprises means for producing a write signal for writing the rear block of data into the data memory unit when the mismatch signal is determined to be absent until the timing generating unit generates another timing signal later than the second timing signal.

In case where the request source produces the control signal comprising a write request as the read/write request and data to be written, the decoder unit extracts the write request to produce a write request signal. The cache control circuit further comprises a unit responsive to the write request signal, the hit signal, and a third one of the timing signal which is later than the second one of the timing signals by a predetermined time interval for producing a write access signal to carry out a writing operation of the data to be written for the data memory unit when the mismatch signal is absent from the address conversion unit until the occurrence of the third timing signal.

DESCRIPTION OF PREFERRED EMBODIMENTS

Figure 1:
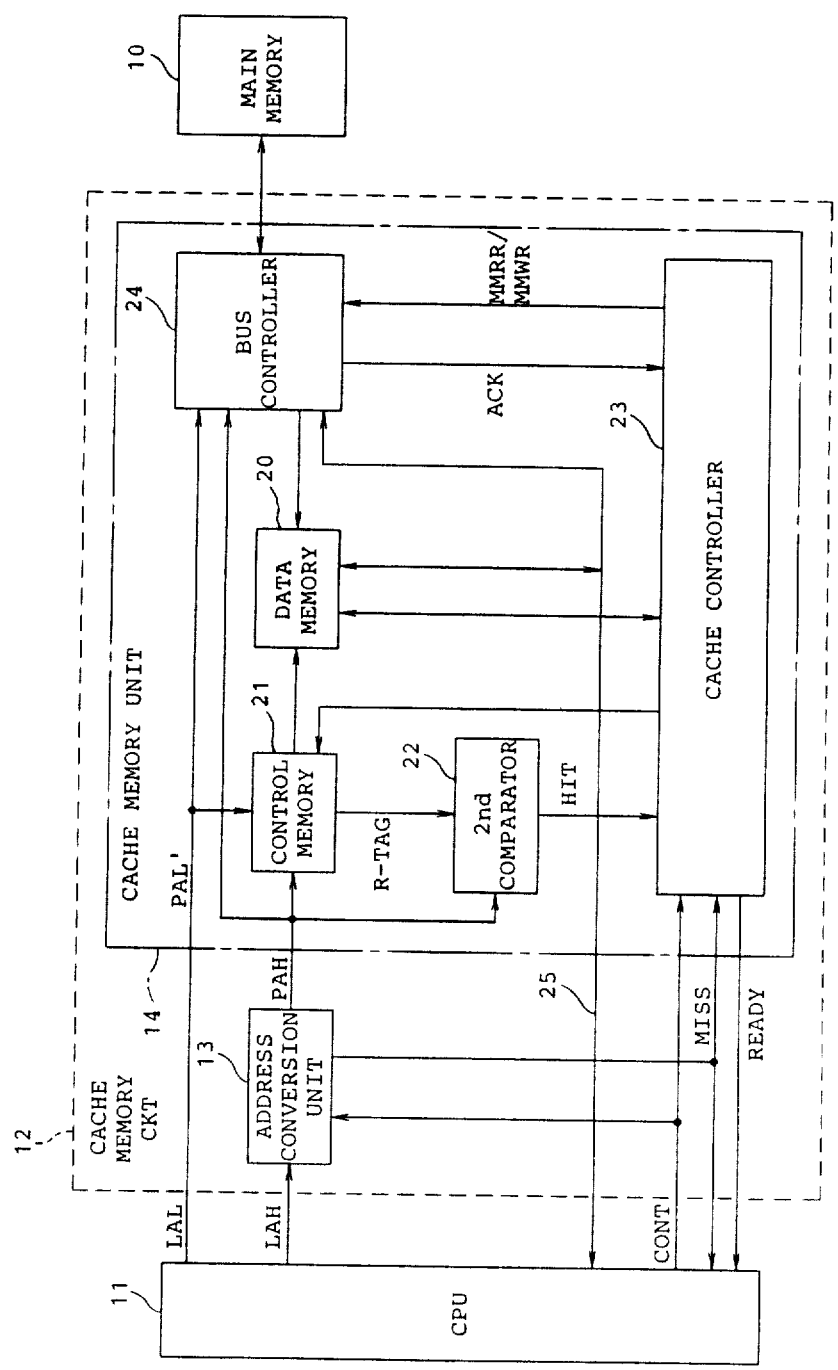
FIG. 1 is a block diagram of an information processing system including a cache memory circuit to which the present invention can be applied.

Referring to FIG. 1, an information processing unit shown therein comprises a main memory 10 for storing data needed for the information processing, a central processing unit 11 for processing information, and a cache memory circuit 12 coupled between the main memory 10 and the central processing unit 11. The cache memory circuit 12 temporarily holds those data of contents in the main memory 10 which are currently used at the central processing unit 11. Accordingly, writing or reading operation of data for the main memory 10 is performed by distributing a request signal from the central processing unit 11 for the main memory 10 to the cache memory circuit. The request signal comprises a logical or virtual address signal and a control signal (CONT).

Figure 2:
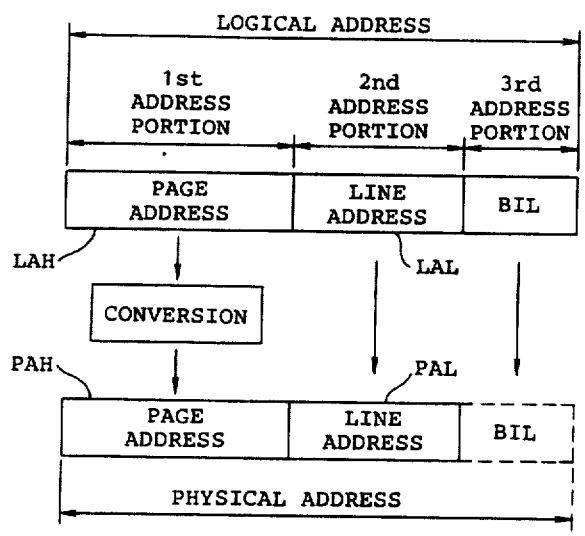
FIG. 2 is a view illustrating formats of a logical address and a real address used in the processing system of FIG. 1.

Referring to FIG. 2, the logical address comprises a first address portion (LAH) which represents a page address, a second address portion (LAL) which represents a line address, and a third address portion which represents a byte in line (BIL). The virtual address is converted into a physical or real address at the address conversion unit 13. However, the second and the third address portions are equal to those in the physical address, and therefore, the first address portion (LAH) of the virtual address is only converted into a physical address by the address conversion unit 13.

Referring again to FIG. 1, the central processing unit 11 delivers a first and a second address signal which represent the (LAH) and (LAL), respectively, the former being applied to the address conversion unit 13 while the latter being applied to the cache memory unit 14.

The control signal (CONT) comprises a read/write request, the third address portion (BIL), and other control data.

When the central processing unit 11 delivers the control signal (CONT) having the write request, the central processing unit 11 produces data on a data line 25 to be stored in the main memory 10 which is supplied to the cache memory unit 14.

Figure 3:
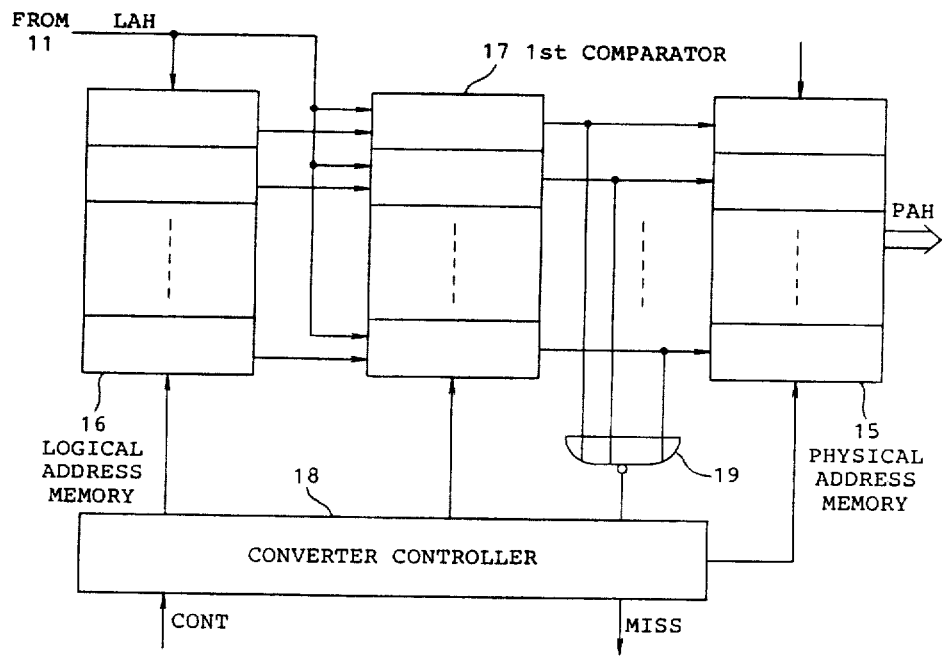
FIG. 3 is a block diagram illustrating, in detail, an address conversion unit in the cache memory circuit in FIG. 1.

Referring to FIG. 3, the address conversion unit 13 comprises a physical address memory 15 for storing a plurality of physical addresses of pages on the main memory 10, that is, physical page addresses, and a logical address memory 16 for storing a plurality of logical addresses, that is, logical page addresses, corresponding to the physical page addresses stored in the physical address memory 15. That is, the physical and logical page address pairs are stored in a pair of the physical and the logical address memories 15 and 16. The physical and the logical address memories 15 and 16 are called a translation lookaside buffer (TLB) in the prior art.

The address conversion unit 13 further comprises a first comparator 17 which comprises a plurality of comparing sections for comparing the first address signal (LAH) from the central processing unit 11 with all of the logical page addresses stored in the logical address memory 16 so as to search for a match of the first address signal (LAH) and one of the logical page addresses. When the match is found, the first comparator 17 produces a matching signal from that one of the comparing sections where the match is found. The matching signal is applied to the physical address memory 15 and the corresponding one of the physical page addresses is delivered as a first physical address signal (PAH) to the cache memory unit 14.

The comparing sections are coupled to a convertor controller 18 through a NOR circuit 19. Accordingly, when no match is found at the first comparator 17, the convertor controller 18 produces a mismatch signal (MISS) which is supplied to the central processing unit 11 and the cache memory unit 14.

The convertor controller 18 receives the control signal (CONT) from the central processing unit 11 and controls operation of the physical and the logical address memories 15 and 16 and the first comparator 17.

In rewriting the physical and logical address pairs, fresh pairs are supplied to those memories 15 and 16 from the central processing unit 11, as shown by arrows on the top of those memories 15 and 16 in the figure. In another known type, the rewriting is performed by the address conversion itself.

Returning to FIG. 1, the cache memory unit 14 comprises a data memory 20 for temporarily holding a pair of data in contents of the main memory 10 and a control memory 21 for holding pairs of physical line addresses and corresponding physical page addresses in physical addresses of the data held in the data memory 20. The physical page addresses are used as address tags in the control memory. The control memory 21 also stores addresses on the data memory 20 which are referred to as data memory addresses and are corresponding to the pairs of the physical line addresses and the address tags.

The second address signal LAL is supplied from the central processing unit 11 to the cache memory unit 14 as a physical line address (PAL) without address conversion. The physical line address (PAL) is applied to the control memory 21. Then, the control memory 21 produces one of the address tags which is paired with the physical line address (PAL) and the corresponding one of the data memory addresses. The produced tag is supplied to a second comparator 22. The produced data memory address is applied to the data memory 20 as a read data memory address.

The second comparator 22 is also coupled to the address conversion unit 13 for receiving a converted physical page address (PAH) and compares the tag from the control memory 21 and the physical page address (PAH) from the address conversion unit 13. When the second comparator 22 detects conformity between them, the second comparator 22 produces and delivers a hit signal (HIT) to a cache controller 23.

The cache memory unit 14 further comprises a bus controller 24 for accessing the main memory 10 in order to write data from the central processing unit 11 into the main memory 10 or to read data from the main memory 10.

When the cache controller 23 receives the control signal (CONT) and the hit signal (HIT) from the second comparator 22 and when the cache controller 23 does not decide the mismatch signal or decides the matching signal from the address conversion unit 13, the cache controller 23 controls the data memory 20, control memory 21, and a bus controller 24 for accessing the main memory 10 so as to process a read request or a write request in the control signal CONT.

When the control signal includes the read request, the cache controller 23 accesses the data memory 20 and reads data from the data memory 20 at an address determined by the data memory address from the control memory 21 and the byte in line (BIL) address in the control signal (CONT). The read data is sent out to the central processing unit 11 through the data line 25.

When the hit signal (HIT) is not supplied from the second comparator 22 and when the mismatch signal is not decided or the matching signal is decided, the cache controller 23 produces a main memory read request signal (MMRR) to the bus controller 24. Then, the bus controller 24 accesses the main memory 10 and reads data at an address in the main memory 10 determined by the physical page and line addresses (PAH) and (PAL) from the address conversion unit 13 and the central processing unit 11, respectively. Then, the bus controller 24 produces an acknowledge signal (ACK) to the cache controller 23. Then, the cache controller 23 writes the data read from the main memory 10 into the data memory 20 and selects correct data from the read data corresponding to the byte in line (BIL) address. The correct data is transferred to the central processing unit 11.

Simultaneously, the control data is updated.

When the control signal (CONT) includes the write operation of data into the data memory 20, the cache controller 23 accesses to the data memory 20 and writes the data from the central processing unit 11 through the data line 25 at the address in the data memory 20 determined by the data memory address from the control memory 21 and the byte in line (BIL) address in the control signal (CONT).

When the no hit signal (HIT) is received at the cache controller 23, the bus controller accesses the main memory in response to a main memory write request signal (MMWR) from the cache controller 23 and writes the data from the central processing unit 11 into the main memory at an address determined by the physical page and line addresses (PAH) and (PAL) from the address conversion unit 13 and the central processing unit 11 and the byte in line (BIL) address in the control signal (CONT).

When the cache controller 23 receives the mismatch signal (MISS) at a predetermined time interval after reception of the control signal, that is, when the cache controller 23 decides the mismatch signal, the cache controller 23 starts neither the read operation nor the write operation.

When the central processing unit 11 receives the mismatch signal (MISS), the central processing unit 11 decides the cache memory cycle to be invalid.

In the system of FIG. 1, the cache controller 23 has been designed so that start of the requested write or read operation in response to reception of the control signal CONT is delayed until decision of absence of mismatch signal (MISS) from the address conversion unit 13. However, as described in the preamble, it takes an unignorable long time until the cache controller 23 decides the mismatch signal (MISS) from the address conversion unit 13 after the cache controller 23 receives the control signal (CONT). This means that the high speed performance of the central processing unit 11 is decreased by the delay.

Figure 4:
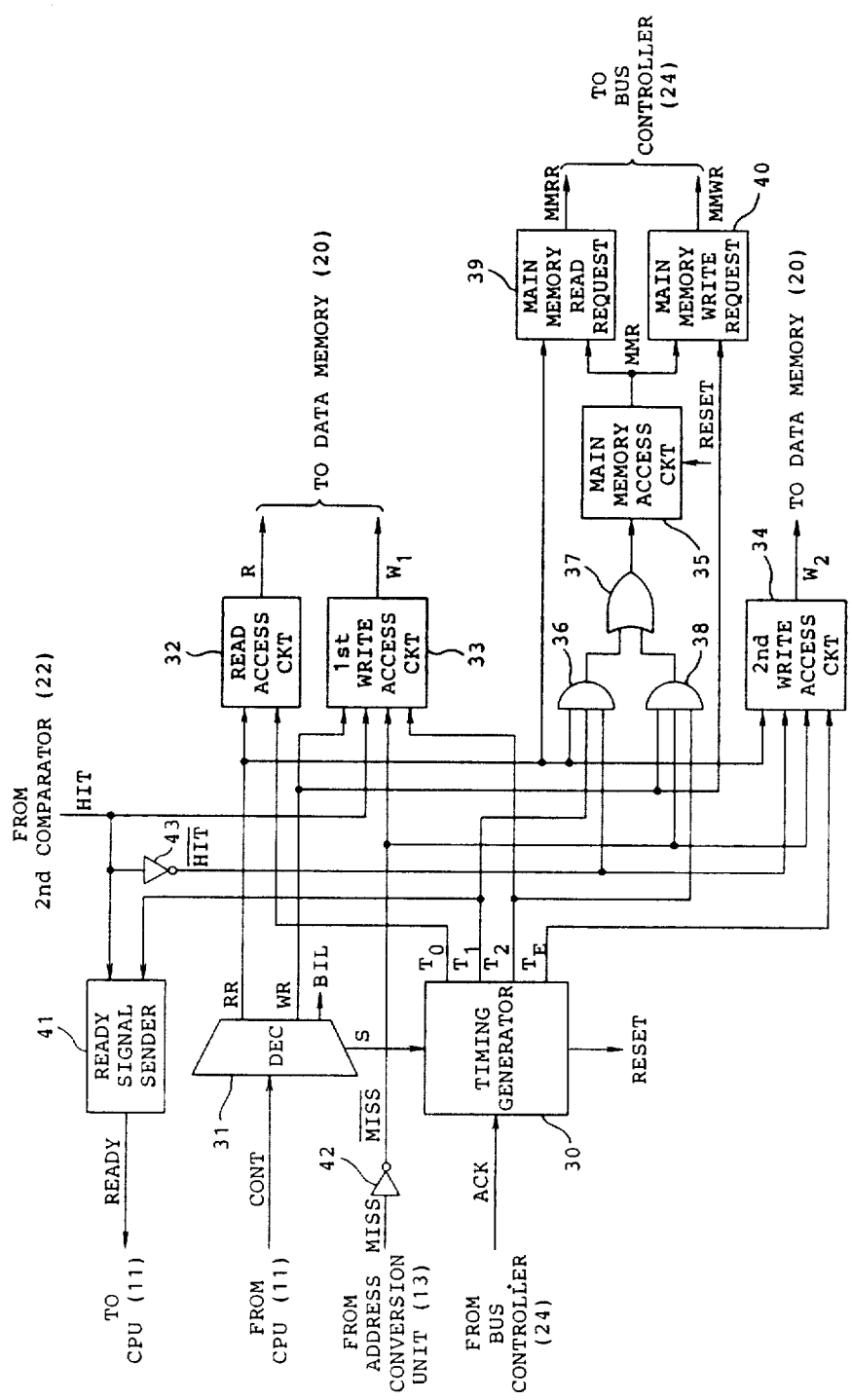
FIG. 4 is a circuit diagram of a cache controller of a cache memory unit according to an embodiment of the present invention.

Referring to FIG. 4, the cache controller 23 according to an embodiment of the present invention comprises a timing generator 30 and a decoder (DEC) 31 for decoding the control signal (CONT) from the central processing unit 11 to extract a read request signal (RR) or a write request signal (WR) and the other control data portion including the byte in line address (BIL). The other control data portion is referred to as a partial control signal and is represented by BIL in the drawings. The decoder 31 produces a start signal (S) to the timing generator 30 which is, in turn, started by the start signal to generate timing signals $T_0$, $T_1$, $T_2$, and $T_E$ in the order at predetermined intervals, as shown in FIG. 5.

The cache controller 23 further comprises a data memory access circuit which comprises a read access circuit 32 for reading data from the data memory 20, a first write access circuit 33 for writing data into the data memory 20, and a second write access circuit 34 for writing a data block from the main memory 10 into the data memory 20.

Figure 5:
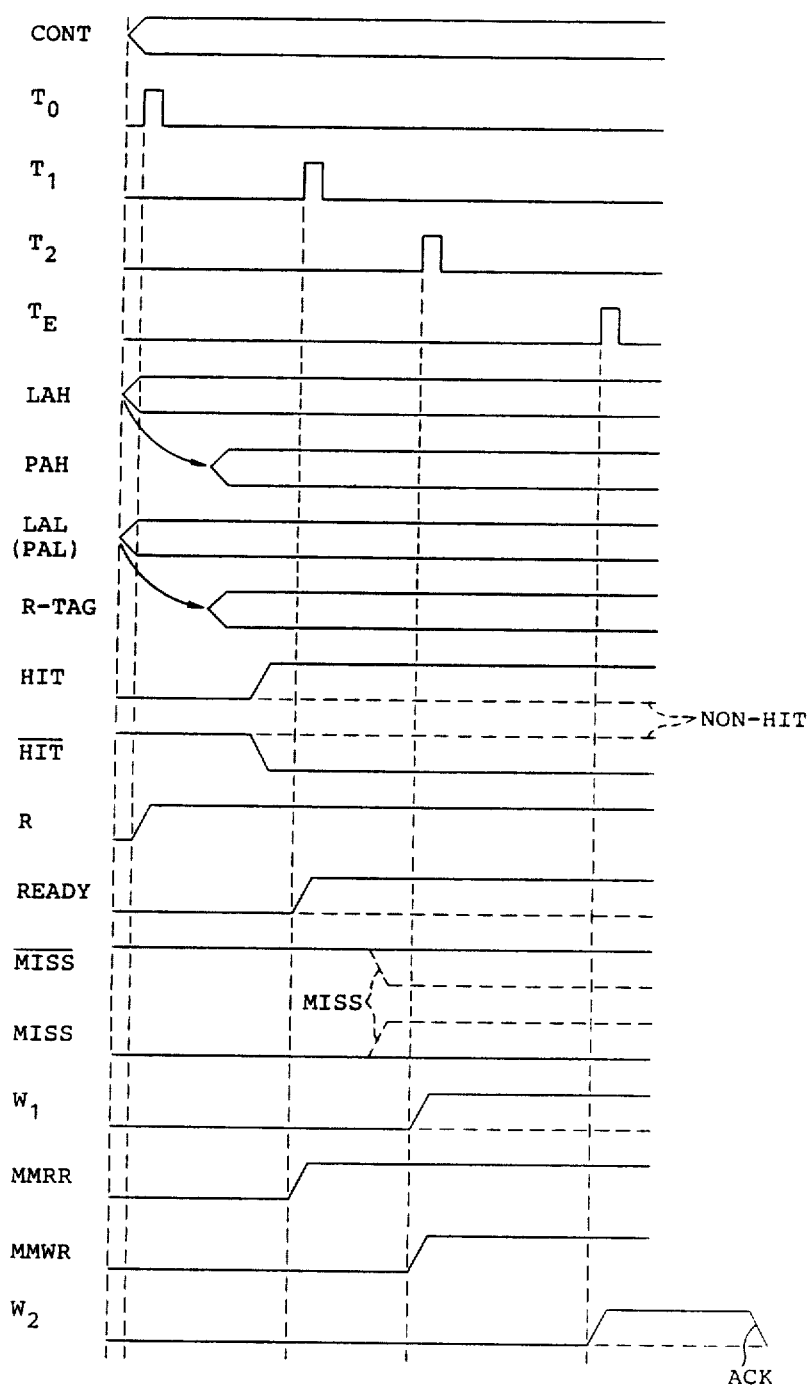
FIG. 5 is a timing chart of various signals in the cache controller in FIG. 4 for illustrating operation of the cache controller.

The read access circuit 32 produces a read signal (R) to the data memory 20 when receiving the read request signal (RR) from the decoder 31 and a first timing signal $T_0$ from the timing generator 30, as shown in FIG. 5. Thus, it is started to read data from the data memory 20 according to the data memory address supplied from the control memory 21.

The first write access circuit 33 is supplied with the write request signal (WR) from the decoder 31, the hit signal (HIT) from the second comparator 22, the third timing signal $T_2$ from the timing generator 30, and a non-mismatch signal ($\overline{MISS}$) from the address conversion unit 13.

In the embodiment shown in FIG. 4, the cache controller 23 is provided with a first inverter 42 coupled with a mismatch signal output terminal of the address conversion unit 13. When the mismatch signal (MISS) is not output, the non-mismatch signal ($\overline{MISS}$) is delivered from the first inverter 42. On the other hand, the non-mismatch signal ($\overline{MISS}$) is not obtained when the mismatch signal (MISS) is delivered from the mismatch signal output terminal of the address conversion unit 13.

The first write access circuit 33 produces a first write signal ($W_1$) to the data memory 20 when those signals (WR, HIT, $\overline{MISS}$, and $T_2$) coincide with one another, as shown in FIG. 5. Thus, the data supplied from the central processing unit 11 is written at an address in the data memory 20 determined by the data memory address supplied from the control memory 21 and the byte in line address (BIL) in the control signal.

The second write access circuit 34 is fed with the read request signal (RR) from the decoder 31, a non-hit signal ($\overline{HIT}$) from the second comparator 22, the non-mismatch signal ($\overline{MISS}$), and the fourth timing signal ($T_E$).

In the embodiment shown in FIG. 4, a second inverter 43 is coupled to the output of the second comparator 22. When the hit signal (HIT) is not delivered from the the second comparator 22, the non-hit signal ($\overline{HIT}$) is produced from the inverter 43. When the hit signal (HIT) is delivered from the second comparator 22, the non-hit signal ($\overline{HIT}$) is not obtained from the second inverter 43.

The second write access circuit 34 produces a second write signal ($W_2$) when those signals (WR, $\overline{HIT}$, $\overline{MISS}$, and $T_E$) coincides with one another, as shown in FIG. 5. In response to the second write signal ($W_2$), the data block is written into the data memory 20 from the main memory 10 through the bus controller 24. Then, the control memory 21 is updated in the similar manner as in the prior art.

The cache controller 23 further comprises a main memory access circuit 35 for producing a main memory access request signal (MMR) representing a request for accessing the main memory 10. The main memory access circuit 35 is energized through a first AND gate 36 and an OR gate 37 when the read request signal (RR), the non-hit signal ($\overline{HIT}$), and the second timing signal ($T_1$) coincide at three inputs of the first AND gate 36. On the other hand, the main memory access circuit 35 is also energized through a second AND gate 38 and the OR gate 37 when the write request signal (WR), the non-mismatch signal ($\overline{MISS}$), and the third timing signal $T_2$ coincide at three inputs of the second AND gate 38.

The main memory access request signal (MMR) is applied to a main memory read request circuit 39 which produces a main memory read request signal (MMRR) when receiving the main memory access request signal (MMR) and the read request signal (RR) from the decoder 31, as shown in FIG. 5. The main memory access request signal (MMR) is also applied to a main memory write request circuit 40 for producing a main memory write request signal (MMWR) as shown in FIG. 5 when receiving the main memory access request signal (MMR) and the write request signal (WR) from the decoder 31.

Each of the main memory read request signal (MMRR) and the main memory write request signal (MMWR) is supplied together with the partial control signal (BIL) to the bus controller 24. Then, the bus controller 24 accesses the main memory 10 to read the data block from the main memory 10 or to write the data from the central processing unit 11 into the main memory 10.

The timing generator 30 produces a reset signal in response to the acknowledgement signal (ACK) from the bus controller 24. The reset signal is applied to the main memory access circuit 35. Thereby, the main memory access circuit 35 is reset.

The cache controller 23 is provided with a ready signal sender 41 which sends out the ready signal to the central processing unit 11 when receiving the hit signal (HIT) from the second comparator 22 and the second timing signal $T_1$ from the timing generator 30.

Referring to FIGS. 4 and 5, operation of the cache controller 23 are described below.

The central processing unit 11 produces signals of the first address portion (LAH) and the second address portion (LAL) of the logical address and the control signal (CONT).

When the control signal (CONT) is received at the cache controller 23, the timing generator 20 starts to sequentially generate the timing signals $T_0$ through $T_E$ as described above and shown in FIG. 5.

The second address portion (LAL) of the logical address is directly supplied to the control memory 21 as a physical line address (PAL) and one of the address tags is read out from the control memory 21. The first address portion (LAH) of the logical address is converted into the physical page address (PAH). The converted physical page address (PAH) is supplied to the cache memory unit 14 with a first delay from application of the physical line address (PAL) as shown in FIG. 5. However, a second delay also occurs until one of the address tags is read out from the control memory 22. It is possible to match the second delay to the first delay so as to remove the time loss caused by the address conversion.

However, the comparison of the physical page address (PAH) and the read tag (R-TAG) is delayed from reception of the control signal (CONT) at the cache controller 23. Accordingly, it is performed by the second timing signal $T_1$ at a delayed time instance to decide whether or not the hit signal (HIT) is delivered from the second comparator 22. When the hit signal (HIT) is decided, the ready signal sender 41 sends out the ready signal to the central processing unit 11. When the hit signal (HIT) is not decided, the ready signal is not sent out but a non-ready condition is informed to the central processing unit 11.

Since it is necessary to sufficiently delay the deciding operation of the mismatch signal (MISS) as described above, the deciding operation of the mismatch signal is performed by occurrence of the third timing signal $T_2$.

However, the read access for the data memory 20 starts prior to the deciding operation of the hit signal (HIT) and the mismatch signal (MISS) because the read signal (R) is produced from the read access circuit 32 by the read request (RR) extracted from the control signal and the first timing signal $T_0$. Then, the data read from the data memory 20 are sent out to the central processing unit 11.

When the non-hit is decided after the read data is sent out to the central processing unit 11, the non-ready condition is informed to the central processor 11 as described above. Therefore, the central processing unit 11 enters a waiting condition so that the sent out data is ignored. Accordingly, the central processing unit 11 does not process the erroneous data.

When the non-hit is decided by the occurrence of the second timing signal $T_1$, the main memory access circuit 35 is set through the AND gate 36 and the OR gate 37 and the main memory read request circuit 39, then, produces the main memory read request signal (MMRR) to the bus controller 24, as described above. Thus, a data block is read out from the main memory 10 and requested data are sent out to the central processing unit 11. Thereafter, the data block is written into the data memory 20 by the second write signal ($W_2$) from the second write access circuit 34 at occurrence of the fourth timing signal $T_E$ in absence of the mismatch signal (MISS), as described above.

If the mismatch signal is decided, the second write signal ($W_2$) is not produced from the second write access circuit 34 and therefore, the data block is not written into the data memory 20. While, the central processing unit 11 decides the cache memory access cycle invalid in response to the mismatch signal. Therefore, no erroneous operation is caused in the system.

If neither the non-hit nor the mismatch is decided at the cache controller 23 until the timing generator 30 generates the fourth timing signal $T_E$, it will be understood that correct data are sent out from the cache memory unit 14.

It is possible without any problem to start the read operation in response to the read request from the central processing unit 11, but before the cache controller 23 decides the hit and the non-mismatch. Therefore, the read access time in cache memory unit 14 is reduced by the present invention so that it is possible to insure the high speed performance of the central processing unit 11.

When the write request (WR) is issued from the central processing unit 11, the write operation for the data memory 20 and the write operation for the main memory 10 are carried out when the hit signal (HIT) and the non-mismatch signal ($\overline{MISS}$) are decided, because the first write access circuit 33 produces the first write signal ($W_1$) when the third timing signal $T_2$, the hit signal (HIT) and the non-mismatch signal ($\overline{MISS}$) coincide with one another, as described above. Therefore, the write operation is similar to the prior art.

In the present embodiment, when the first write signal ($W_1$) is produced, the main memory write request signal (MMWR) is also produced from the main memory write request circuit 40. That is, the present embodiment is shown in connection with the cache memory unit of a store-through type where the data from the central processing unit 11 are stored in both of the data memory 20 in the cache memory unit 14 and the main memory 10. However, the present invention is applicable to the cache memory unit of another type such as the store-in type or a copy-back type.

What is claimed is:

1. In a cache control circuit in a cache memory unit for use in cooperation with a main memory, a request source, and an address conversion unit, said request source producing a control signal comprising a read/write request together with a logical address comprising a first logical address portion and a second logical address portion, said address conversion unit converting said first logical address portion into a first physical address portion corresponding to said first logical address portion to produce said first physical address portion as a converted address signal at an output terminal when said address conversion unit has said first physical address portion corresponding to said first logical address portion, said address conversion unit producing a mismatch signal when said address conversion unit has no first physical address portion corresponding to said first logical address portion, said mismatch signal being delivered to said cache control circuit and said request source at a predetermined time duration after reception of said control signal, said request source deciding that said read/write request is invalid upon reception of said mismatch signal, said second logical address portion being directly applied to said cache memory unit as a second physical address portion without conversion, said cache memory unit comprising data memory means for temporarily holding a data block of data in said main memory which is currently used by said request source, control memory means for holding pairs of address tags and data memory addresses of said data block held in said data memory means, said control memory means being responsive to said second physical address portion producing one pair of said pairs of said address tags and said data memory addresses which correspond to said second physical address portion as a read address tag and a read data memory address, and comparing means coupled with said output terminal of said address conversion unit for comparing said read address tag with said converted output signal at said output terminal to deliver a hit signal to said cache control circuit when said read address tag is in conformity with said converted output signal, said cache control circuit receiving said control signal, said cache control circuit producing a read access signal for carrying out a read operation for said data memory means with use of said read data memory address when said read/write request of said control signal is a read request, said cache control circuit comprising:

decoding means responsive to said control signal for decoding said control signal to extract said read request to produce a read request signal, said decoding means producing a start signal on reception of said control signal;

timing generator means coupled to said decoding means and responsive to said start signal for sequentially generating timing signals at predetermined intervals; and means coupled with said decoding means and said timing generator means for producing said read access signal to said data memory means upon reception of both of said read request signal and a first one of said timing signals which is initially produced from said timing generator means, whereby a read operation for said data memory means starts without relation to said hit signal and said mismatch signal.

2. A cache control circuit as claimed in claim 1, which further comprises hit signal detecting means, coupled with said timing generator means, responsive to a second one of said timing signals which is later than said first one by a predetermined time interval for detecting whether or not said hit signal is delivered from said comparing means, said hit signal detecting means delivering a ready signal to said request source when said hit signal is detected, said request source entering a waiting condition in the absence of said ready signal.

3. A cache control circuit as claimed in claim 2, said cache memory unit further comprising means responsive to a main memory read request signal from said cache control circuit for accessing said main memory for reading, as a read block of data, data from an address in said main memory determined from said first and second physical address portions, wherein said cache control circuit further comprises means for generating said main memory read request signal when said hit signal is not detected in response to said second timing signal.

4. A cache control circuit as claimed in claim 3, which further comprises means for producing a write signal for writing said read block of data into said data memory means when said mismatch signal is not detected until said timing generator means generates another timing signal later than said second timing signal.

5. A cache control circuit as claimed in claim 2, said request source producing said control signal comprising a write request as said read/write request and data to be written, wherein said decoder means extracts said write request to produce a write request signal, said cache control circuit further comprising means responsive to said write request signal, said hit signal, and a third one of said timing signals which is later than said second one of said timing signals by a predetermined time interval for producing a write access signal to carry out a writing operation for said data to be written in said data memory means when said mismatch signal is not detected until occurrence of said third timing signal.

* * * * *